United States Patent [19]

Meijers

[11] Patent Number: 5,929,859
[45] Date of Patent: Jul. 27, 1999

[54] PARALLACTIC DEPTH-DEPENDENT PIXEL SHIFTS

[75] Inventor: Patrick F. P. Meijers, Eindhoven, Netherlands

[73] Assignee: U.S. Philips Corporation, New York, N.Y.

[21] Appl. No.: 08/768,484

[22] Filed: Dec. 18, 1996

[30] Foreign Application Priority Data

Dec. 19, 1995 [EP] European Pat. Off. .............. 95203553
Jul. 1, 1996 [EP] European Pat. Off. .............. 96201823

[51] Int. Cl.⁶ ..................................................... G06T 17/00
[52] U.S. Cl. ............................................................ 345/419
[58] Field of Search ................................... 345/418, 419, 345/420, 421, 422, 423, 424, 433

[56] References Cited

U.S. PATENT DOCUMENTS

| | | | |
|---|---|---|---|
| 5,379,369 | 1/1995 | Komma et al. | 395/119 |
| 5,502,798 | 3/1996 | Ito et al. | 345/422 |
| 5,537,520 | 7/1996 | Doi et al. | 345/422 |
| 5,542,025 | 7/1996 | Brown | 345/422 |
| 5,671,157 | 9/1997 | Saito | 345/419 |
| 5,671,344 | 9/1997 | Stark | 345/419 |

OTHER PUBLICATIONS

IEEE Computer graphics & Applications, Tutorial: Time–Multiplexed Stereoscopic Computer Graphics, Mar., 1992.

*Primary Examiner*—Phu K. Nguyen
*Assistant Examiner*—Cliff N. Vo
*Attorney, Agent, or Firm*—Gregory L. Thorne

[57] ABSTRACT

An output image is created through a parallactic transformation of an input image. Pixels of the input image are supplied as a color value and a depth value. A depth converter 520 converts the depth value into a depth-dependent pixel shift, which is stored in a memory 510 together with the color value. A processor 530 generates the output image from the stored input image for 'on the fly' supply to a stereoscopic display system by shifting the input pixels. A 3D-rendering process may be used to generate one input image for a pair of stereoscopic output images, or occasionally for moving images, whereas the depth-dependent shifts are used to create the parallactic image effects. Artifacts such as undesired holes or overlaps resulting from the shifts are avoided.

17 Claims, 7 Drawing Sheets

FIG. 7B

PARALLACTIC DEPTH-DEPENDENT PIXEL SHIFTS

BACKGROUND OF THE INVENTION

1. Field of the Invention

The invention relates to an image processing system for generating at least one output image related to an input image through a parallactic transformation; the image processing system comprising input means, output means, a memory and a processor; the input means comprising means for receiving a respective input pixel value and input pixel depth of input pixels of the input image and for storing received input pixel values in the memory; the processor being operative to create output pixels of the output image by deriving for the output pixel a respective output pixel value from the input pixel value of at least one input pixel, which is parallactically related to the output pixel; the parallactic relationship being a function of the respective input pixel depth; the output means comprising means for outputting the output pixel values.

The invention further relates to a processor for parallactically transforming an input image into at least one output image; the processor comprising an input for receiving a respective input pixel value of input pixels of the input image and an output for outputting a respective output pixel value for output pixels of the output image; the processor being operative to create the output pixel by deriving a respective output pixel value from the input pixel value of at least one input pixel, which is parallactically related to the output pixel.

2. Description of Related Art

The interest in providing a depth sensation when displaying an image on a 2D display is growing rapidly, notably in virtual reality applications and computer games. Various forms of providing depth cues, such as influencing the brightness level or the size of an object, are known. Particularly, stereopsis, or stereoscopic vision, receives much attention as a technique for providing depth sensation. Stereopsis is evoked by presenting to a person two 2D images of the same scene as observed from two positions a little way apart. One of the images is presented to the left eye, the other one is presented to the right eye. The two images are parallactically related. The term "parallax" refers to the apparent displacement or the difference in apparent direction of an object as seen from two different points not on a straight line with the object. Parallax allows a person to perceive the depth of objects in a scenery.

It is known from U.S. Pat. No. 5,379,369 to generate from one 2D input image separate output images for each of the eyes. In the known system, the 2D input image represents objects observed from a point corresponding to a middle point in between both eyes. The left eye image is a 2D representation of the objects observed from a point corresponding to the visual point of the left eye. The right eye image is a 2D representation of the objects observed from a point corresponding to the visual point of the right eye. Typically, the 2D input image is given in the form of an array of pixels. It may, for instance, have been obtained using a camera or computer graphics. For each of the pixels of the input image additional depth information is available. In the known system, depth information is derived from the 2D input image itself, for instance based on brightness levels of pixels of the 2D input image. Based on the parallax when observing the same object from the visual point of the eyes and from the middle point in between the eyes, the pixels of the left eye image and the right eye image are derived from the pixels of the input image by shifting the pixels. By choosing the horizontal axis of the co-ordinate system as being parallel to the line connecting both eyes, only a horizontal shift occurs. The amount of shift of a pixel depends on the depth information. Typically, a graphical processing system suitable for generating parallactically related images from an input image comprises a memory, such as a graphics memory, for storing the 2D input image with the additional depth information. The 2D input image and the depth information are usually supplied by an application program. Typically, a copy of the 2D input image and the depth information is also stored in a memory for use by an image processing system. The image processing system generates one or more 2D output images from the 2D input image and the depth information. The output images are parallactically related to the input image. The generation is achieved by performing a depth dependent shift of the pixels of the 2D input image. The 2D output images are stored in a graphics memory. Using a D/A converter the 2D output images are displayed using a suitable stereoscopic display system. Many display techniques for displaying stereoscopic images are known. Using a time-parallel technique, both output images are presented simultaneously to one or two displays. For example, both images may be filtered with complementary colours and superimposed on one display. The observer wears glasses with filters that match the projection filters. Alternatively, both images may be displayed alongside on one display and viewed using a viewer which directs each image to the correct eye. As another example, two displays may be used to present two differently polarised pictures, which are viewed through correspondingly polarised glasses. Alternatively, both images may be presented using a head-mounted device with separate displays for each eye. Also time-multiplexed techniques may be used, where the left and right images are alternatingly displayed on one display. As an example, one image is written to the even scan lines of a monitor and the other image to the odd scan lines. A shutter system is used to occlude the left eye when the right-eye image is displayed and to occlude the right eye when the left-eye image is displayed. The shutter system may be mounted in glasses worn by the observer. Alternatively, a shutter with a controllable polariser is placed in front of the display and the observer wears a head-mounted device with polarised glasses.

The known image processing system is relatively costly for use in consumer products, such as game computers and PCs. Moreover, only moderate quality can be achieved.

OBJECTS AND SUMMARY OF THE INVENTION

It is an object of the invention to provide a fast and cost-effective system of the kind set forth, which enables the generation of parallactically related images of a high quality.

To achieve this object, the system according to the invention is characterised in that the input means comprises a depth converter for converting the input pixel depth into an input pixel shift and for storing a representation of the input pixel shift in the memory; and in that the processor is conceived to determine the parallactic relationship between an output pixel and an input pixel based on the stored input pixel shift representation corresponding to the input pixel.

The pixel shift range is typically less than the pixel depth range. By storing the pixel shift, instead of the pixel depth, the storage requirements may be reduced. Additionally or alternatively, the pixel depth range may be increased allowing for a more discriminative shifting of pixels while the storage requirements do not increase. As an example, for a system using a 16-bit pixel depth it may be sufficient to store only 4 to 6 bits of pixel shift information. Furthermore, the pre-processing performed by the depth converter reduces the load on the processor, allowing a cost-effective processor to be used for deriving the output image 'on the fly' from the input image. Preferably, the depth converter converts and stores a plurality of successive pixels before the processor processes the pixels. Advantageously, such plurality includes all pixels of the image, all pixels of a line of the image or an amount of pixels corresponding to a maximum pixel shift (e.g. if a pixel can be shifted over a maximum of 16 pixel positions, at least 16 pixels are processed by the depth converter, before being processed by the processor).

An embodiment of the system, according to the invention wherein the pixel shift is limited to a predetermined maximum of N pixel positions, is characterised in that the processor comprises a sliding buffer with at least N locations for storing pixel values and in that the processor is operative to process successive input pixels; said processing comprising:

copying the respective input pixel value from the memory into the sliding buffer at a location with an offset depending on the corresponding input pixel shift, outputting an output pixel value by reading a pixel value from an output location in the sliding buffer, and shifting the sliding buffer.

The pixels of the output image are created using only a small sliding buffer without requiring to store the output image. This also simplifies the operation of the processor, contributing to a fast and cost-effective implementation of the processor.

An embodiment of the system, according to the invention wherein the processor is operative to, if a foreground and a background input pixel are parallactically related to a same output pixel, select the foreground input pixel for further processing, is characterised in that the processor comprises an indicator for indicating whether the sliding buffer locations are occupied; in that the processor is operative to perform the selection by only copying an input pixel value into a location of the sliding buffer if the indicator indicates that the location is not occupied.

An input pixel may be shifted in either direction, depending on whether the object represented by the pixel is located in front or behind the focus plane. Moreover, the amount of pixel positions being shifted depends on the depth of the object. Consequently, more than one input pixel may be shifted to the same output pixel. This can be visualised by considering that from an observation point matching the input image certain objects at different depths may not overlap (or overlap only partially), whereas from the observation point matching the output image the objects do overlap (or overlap more). In the known system, each time an input pixel is shifted to an output pixel location, to which already another input pixel has been copied, the corresponding depth information of both input pixels involved is used to ensure that the foreground input pixel is selected. The insight of the inventor is that by using a buffer with the indicator, the desired input pixel can be selected by merely checking whether the buffer location of the output pixel is already occupied. No depth information is required any more.

An embodiment of the system, according to the invention wherein the processor is operative to, if a foreground and a background input pixel are parallactically related to a same output pixel, select the foreground input pixel for further processing, is characterised:

in that the processor comprises an indicator for indicating whether the sliding buffer locations are occupied;

in that the processor is conceived to process input pixels of a row of the input image in a given processing direction;

in that the processor comprises a selector for selectively copying an input pixel value into a location of the sliding buffer, in dependence of a relative position of an output observation point matching the output image compared to an input observation point matching the input image; the selector being operative to:

if the direction from the input observation point to the output observation point is the same as the processing direction, copy the input pixel value irrespective of the location being occupied, and if the direction from the input observation point to the output observation point is opposite to the processing direction, copy the input pixel value if the indicator indicates that the location is not occupied. The insight of the inventor is that, if the direction from the input observation point to the output observation point is the same as the processing direction, then automatically the foreground input pixel is selected. If both directions are opposite, then the desired input pixel can be selected by merely checking whether the buffer location of the output pixel is already occupied. The selector allows the processor to effectively select the appropriate input pixel in dependence of the relative position of the input and output observation points.

An embodiment of the system, according to the invention wherein the processor comprises a duplicator for, if none of the input pixels is parallactically related to a given output pixel, creating a respective output pixel value of the output pixel by reproducing an input pixel value, is characterised in that the processor comprises an indicator for indicating whether the sliding buffer locations are occupied; and in that the duplicator is operative to reproduce a pixel value which was output previously from the sliding buffer if the indicator indicates that the predetermined output location of the sliding buffer is not occupied.

In contrast to input pixels being shifted to the same output pixel, it may also occur that no input pixel is shifted to a certain output pixel location. This can be visualised by considering that, from an observation point matching the input image, objects at different depths may partially overlap, whereas from the observation point matching the output image the objects overlap less (a larger section of a partially obscured background object is visible). The 'holes' which may occur in this way, are filled by duplicating the previously output pixel. Preferably, the direction from the output observation point to the input observation point is the same as the processing direction. In this way, typically, a background input pixel is reproduced, representing the emerged part of the background object.

An embodiment of the system, according to the invention is characterised in that the input pixel shift comprises a sub-pixel shift indicative of a shift of the corresponding input pixel to a position in between pixel positions of the output image; and in that the processor comprises a mixer for blending pixel values of neighbouring pixels, where weighting factors of the blending depend on the sub-pixel shift of the neighbouring pixels. By using the sub-pixel shift for blending neighbouring pixels, a high quality output can be achieved wherein no clearly noticeable depth-related jumps in shift occur, which would otherwise have given the impression of a series of shifted, parallel planes.

An embodiment of the system, according to the invention is characterised in that the depth converter comprises a table for converting the input pixel depth into the input pixel shift.

Using a table is an effective way of transforming the pixel depth, which may, for instance, be represented using 16 bits, into the pixel shift, which may, for instance, be four to six bits.

An embodiment of the system, according to the invention is characterised in that the depth converter comprises compression means for compressing the input pixel shift of at least one input pixel into the input pixel shift representation, and in that the processor comprises decompression means for decompressing the input pixel shift representation into the input pixel shift of the corresponding input pixel(s). By compressing the pixel shifts the storage requirements are reduced even further.

An embodiment of the system, according to the invention wherein the processor is operative to generate at least two output images, which are related to the same input image through a parallactic transformation, is characterised in that the input image constitutes one of the output images. By presenting one of the output images as the input image, one less image needs to be generated. For conventional stereovision with two output images, derived from one input image, either the left or right image may be presented to the system as the input image. The other output image is derived from the input image through the parallactic translation.

An embodiment of the system, according to the invention wherein the processor is operative to generate at least two output images which are related to the same input image through a parallactic transformation, is characterised in that an input observation point matching the input image is not horizontally in between output observation points matching each of the output images.

In this way the same processing can be used to derive each output image from the input image.

An embodiment of the system, according to the invention is characterised in that the direction from the input observation point to the output observation point is opposite to the direction in which the processor processes the input pixels of a row of the input image. In this way the processing is simplified.

An embodiment of the system, according to the invention wherein the system comprises a display system for displaying the output image on a display, is characterised in that the processor is directly connected to the display system for supplying the output pixels. This avoids the use of additional graphics memory for storing the output from the processor.

To achieve the object of the invention, the processor is characterised:

in that the processor comprises an input for receiving a representation of a respective input pixel shift of the input pixel; the input pixel shift being limited to a predetermined maximum of N pixel positions, in that the processor comprises a sliding buffer with at least N locations for storing pixel values; and in that the processor is operative to process successive input pixels; said processing comprising:

copying the respective input pixel value from the memory into the sliding buffer at a location with an offset depending on the corresponding input pixel shift, outputting an output pixel value by reading a pixel value from an output location in the sliding buffer, and shifting the sliding buffer.

BRIEF DESCRIPTION OF THE DRAWINGS

These and other aspects of the invention will be apparent from and elucidated with reference to the embodiments shown in the drawings.

DESCRIPTION OF THE PREFERRED EMBODIMENTS

Figure 1:
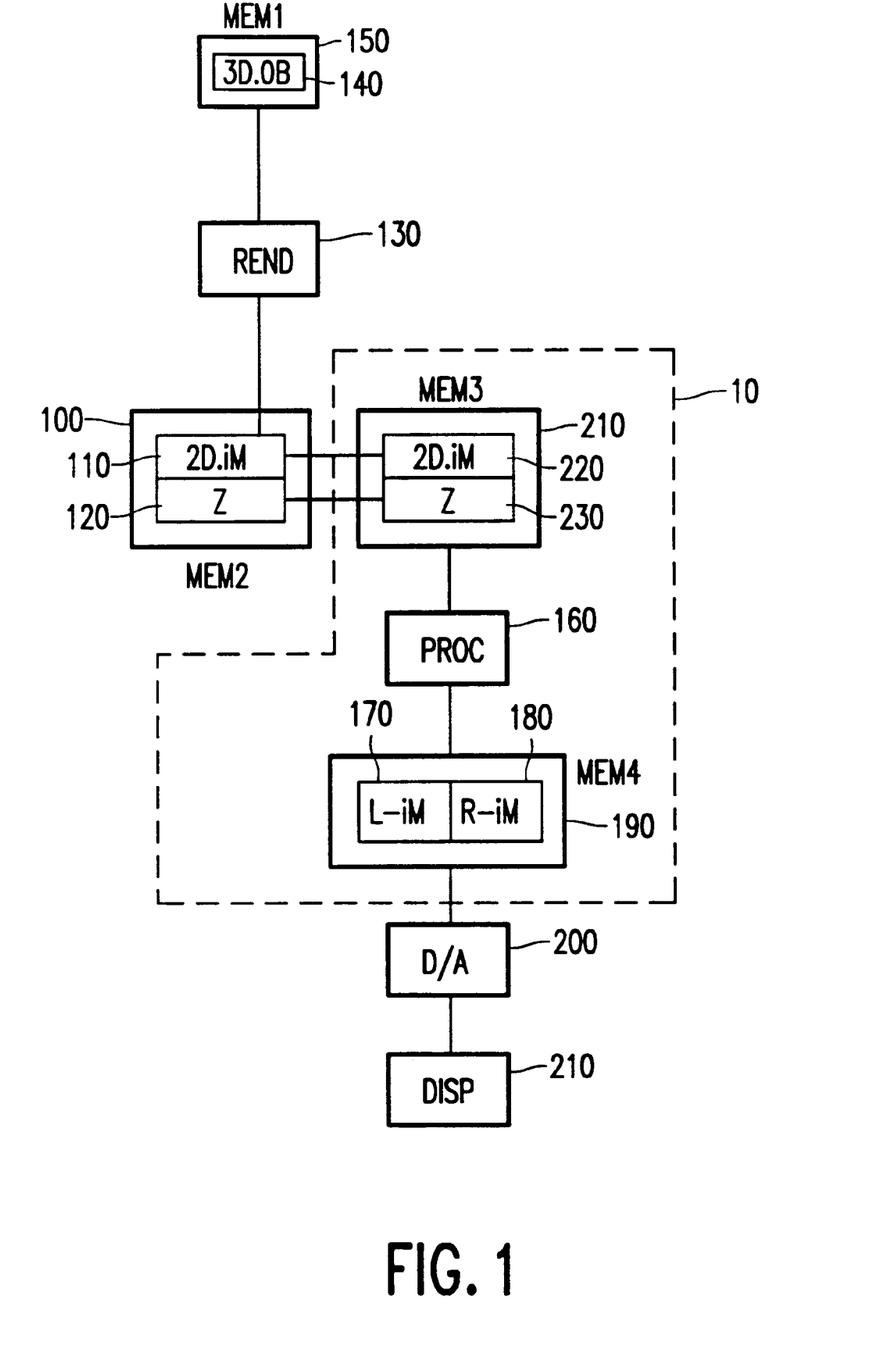
FIG. 1 shows a block diagram of a conventional system incorporating an image processing system.

FIG. 1 shows a block diagram of a conventional system in which the image processing system according to the invention may advantageously be used. The conventional system comprises a memory 100, such as a graphics memory, for storing a 2D input image 110. The input image 110 is comprised of an array of pixels divided in rows and columns. For each pixel a pixel value is given. Various ways of representing a pixel value are well known, such as an RGB (Red, Green, Blue) or YUV coding. The pixel value may be stored in full, e.g. using 16 or 24 bits per pixel. Alternatively, a Colour Look-Up Table (CLUT) scheme may be used to code the pixel value using less bits, e.g. 8 bits. In addition to the pixel value, for each pixel a depth value is stored in the memory 100 as the input depth 120. The depth value may, for instance, be stored using 16 bits per pixel. If required, a separate memory may be used for storing the input depth 120. On a game computer or personal computer the input image 110 and the input depth 120 are usually generated by a 3D-rendering process 130 which derives the information from a 3D model 140 stored in a memory 150. Typically, the memory 150 is part of the main memory of the computer. The memory 150 may be formed by any suitable storage means, such as RAM, ROM, magnetic or optical background storage. The 3D-rendering process 130 is typically executed using the main CPU of the computer or by means of a graphics processor or accelerator. It will be appreciated that the input image 110 and the input depth 120 may also be supplied or generated in other ways. As an example, communication means, such a telecommunication means, audio/video broadcasting or a cable network, may be used to supply the input image 110 and the input depth 120. As an alternative to the 3D-rendering process 130, other means may be used to generate an image and depth information. As an example, two cameras located at different positions may be used, preferably each representing a different eye. From the two 2D-images obtained by the cameras, one image plus depth information can be formed. The depth information can then be supplied in addition to and, preferably, compatible with the conventional supply of only one 2D image, allowing the scene to be observed using either a conventional 2D display system or a stereoscopic display system.

A processor 160 uses the input image 110 and the input depth 120 to generate at least one output image. In the example shown in FIG. 1, a left image 170 and a right image 180 are generated. The left image 170 represents a 2D representation of the 3D scene as observed from an observation point coinciding with the left eye of an observer. Similarly, the right image 180 represents a 2D representation of the 3D scene as observed from an observation point coinciding with the right eye of an observer. Typically, the processor 160 builds the output images in a memory 190, such as a graphics memory. Usually a D/A converter 200 presents the output images on a suitable display 210, such as a stereoscopic display. In order to allow the processor 160 to operate on the input image and input depth without being time-synchronised at pixel level to the supply of this information, typically a memory 210 is used for storing an input image 220 and input depth 230, being a respective copy of the input image 110 and input depth 120. The processor 160 then operates on the input image 220 and input depth 230, independent from the 3D-rendering process 130 supplying the input image 110 and input depth 120. At suitable moments, e.g. when a complete new image has been created, the input image 110 and the input depth 120 are copied to the respective input image 220 and input depth 230. In a situation where the memory 100 and the memory 210 are physically combined in one memory block, the copying may be performed without physically copying the data, for instance by reassigning pointer registers.

The parallactic transformation of the input image into the output image is associated with displacements of 3D objects relative to each other. The displacements occur as a consequence of, e.g., a change in the location of the observer relative to the scene, a change in the orientation of the observer relative to the scene, changing positions of the objects relative to each other due to their relative velocities, or a combination of these changes.

Figures 2A, 2B, 2C:
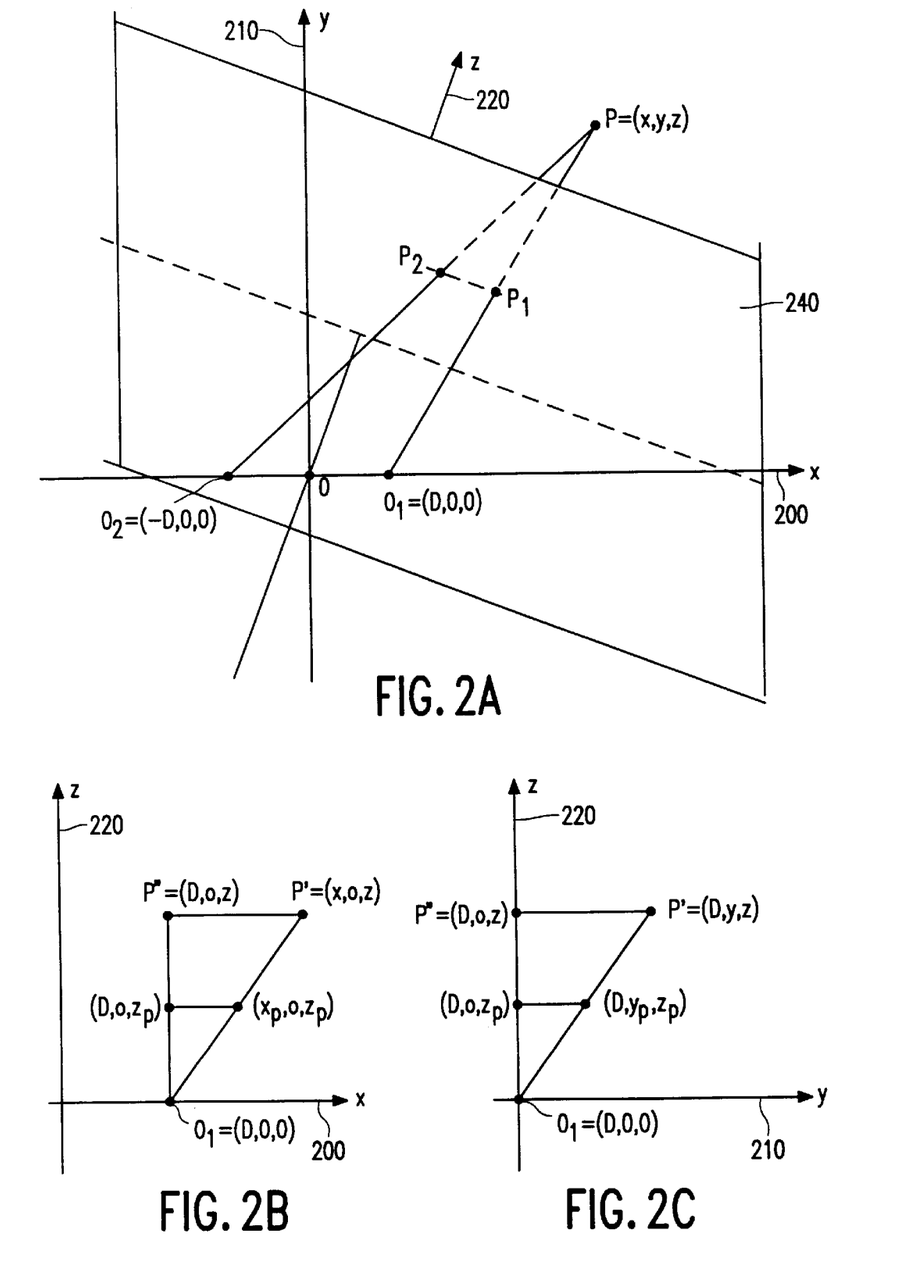
FIGS. 2A–2C show a perspective projection.

FIG. 2A shows a perspective projection. Shown is a 3D-co-ordinate system with an x-axis 200, y-axis 210 and a z-axis 220. A 2D image is comprised of an array of discrete pixels arranged in rows and columns. Pixels in this context are the smallest entities considered by the image processing according to the invention. Each respective pixel of a specific row in the image can assume only a respective one of a series of discrete positions. Each row of pixels in an image runs parallel to the x-axis 200, so that individual pixels in a row are discriminated on the basis of their respective x-coordinates. Each column of pixels runs parallel to the y-axis 210 that points in a direction perpendicular to the x-axis 200. The depth of the scene is measured along the z-axis 220, which runs perpendicular to both the x-axis 200 and the y-axis 210. A respective z-value is assigned to each particular pixel in order to represent the depth of the scenery for that particular pixel. For explaining the parallactic shifting of pixels, the origin O=(0, 0, 0) and the orientation of the co-ordinate system are chosen such that a 3D-object, represented by the point P=(x, y, z) is observed from the observation point $O_1$=(D, 0, 0). The plane $z=z_p$ is chosen to be the focus plane 240 (the plane on which the eyes of the observer focus). Usually, the plane of the display is chosen to coincide with the focus plane. The 2D image observed from the observation point $O_1$ is formed by a projection of the 3D objects on the focus plane, which is also referred to as the projection plane. The point P is projected onto $P_1$=($x_p$, $y_p$, $z_p$).

FIG. 2B shows a projection of FIG. 2A onto the plane y=0. P is projected onto P'=(x, 0, z); P"=(D, 0, z). From the triangle $O_1$, P', P" it follows that: $z_p/z=(x_p-D)/(x-D)$, giving $x_p=D+(x-D).z_p/z$.

FIG. 2C shows a projection of FIG. 2A onto the plane x=D. P is projected onto P'=(D, y, z); P"=(D, 0, z). From the triangle $O_1$, P', P" it follows that: $z_p/z=y_p/y$, giving $y_p=y.z_p/z$.

This gives that $P_1$=(D+(x−D).$z_p/z$, y.$z_p/z$, $z_p$). Similarly, $P_2$=(−D+(x+D).$z_p z$, y.$z_p/z$, $z_p$). Similar formulas are given in [IEEE Computer graphics & Applications, Tutorial: Time-Multiplexed Stereoscopic Computer Graphics, March 1992]. From the formulas, it follows that by choosing the x-axis to be parallel to the line through the observation points, the y coordinates of $P_1$ and $P_2$ are the same. So, when deriving an image observed from $O_2$ from the image observed from $O_1$, no vertical parallax occurs. In general, by choosing the x-axis in this way the calculation of the parallax is simplified. The pixels of the output image can be derived from the input image. Assuming that the input image corresponds with the image as observed from $O_1$ and the output image corresponds with the image as observed from $O_2$. Assuming further that for input pixel $p_i$=($x_i$, $y_i$) the pixel value is given, as well as the depth $z_i$ of the 3D point P(x, $y_i$, $z_i$) from which $p_i$ is derived. The corresponding output pixel $p_o$=($x_o$, $y_o$), with $y_o=y_i$, is related to the same 3D point P(x, $y_i$, $z_i$). This gives:

$x_i$=D+(x−D).$z_p/z_i$, and $x_o$=−D+(x+D).$z_p/z_i$.

This implies that $x_o$ can be derived from $x_i$ in the following way: $x_o=x_i-2D+2D.z_p/z_i=x_i+2D(z_p/z_i-1)$.

The output image can, therefore, be derived from the input image by performing a horizontal shift d (only in the x-direction) of:

$$d=2D(z_p/z-1). \quad (1).$$

From this formula it can be observed that the shift is proportional to the inverse of the depth. In the formula, 2D corresponds to the offset between the observation points $O_1$ and $O_2$. This also corresponds to the parallax in the furthest allowed point (z=∞). Usually, the maximum parallax is restricted to being less than the offset between the observation points. This can be achieved by choosing a smaller value for 2D. For a conventional 17" display good results have been achieved by choosing 2D to be 8 pixels. It should be noted that since the eyes converge in the plane of $z_p$, no parallax occurs for objects in this plane. Objects with the maximum allowed depth have a shift of 2D. Objects with a depth of ½.$z_p$ have a shift of −2D (in a direction opposite to the parallax of the objects with maximum depth). Preferably, the minimum depth is restricted to ½.$z_p$, resulting in the maximum shift in either direction being the same. The depth z may be represented in various ways. For instance, a 16-bit encoding on a linear scale may be used, where the depth of an object with minimum allowed depth is encoded as 0000H (hexadecimal) and the depth of an object with maximum allowed depth is encoded as FFFFH. Persons skilled in the art will be able to select appropriate other representations, if so desired.

As described above, the absolute direction of a shift is influenced by an object being in front or behind the focus plane. It should also be noted that the absolute direction of the shift is also determined by the relative horizontal positions of the observation points of the images. In the example given above, the observation point $O_2$ of the output image is to the left of the observation point $O_1$ of the input image. If the observation points are swapped, the shift is in opposite direction (replacing D by −D in the formulas). In such a case, objects with the maximum allowed depth have a shift of −2D and objects with a depth of ½.$z_p$ have a shift of 2D. By choosing 2D to correspond to 8 pixels, an 8-pixel shift can occur in either horizontal direction. As such, 4 bits are required for storing the shift.

Figure 3A:
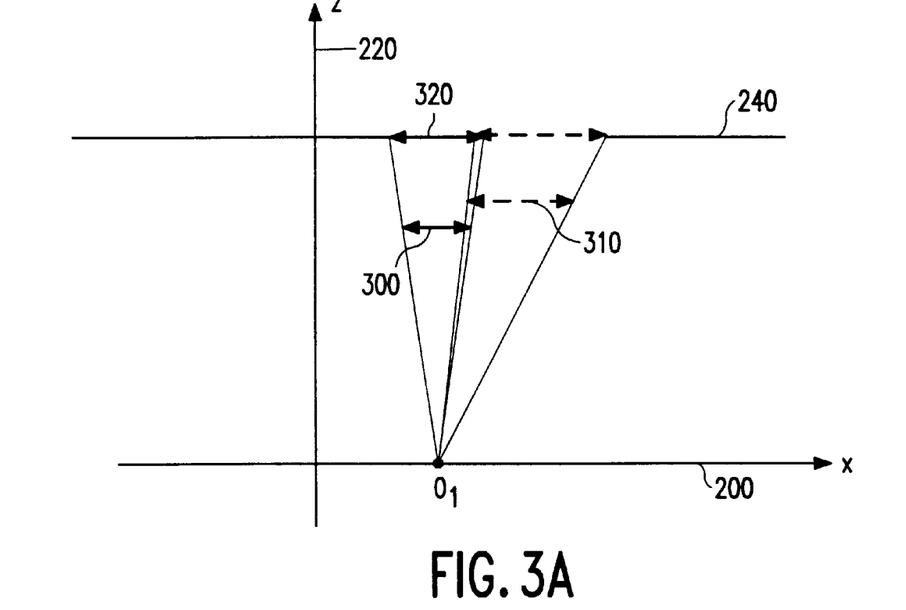
FIGS. 3A–3B illustrate increased overlapping of objects when observed from a different position.
Figure 3B:
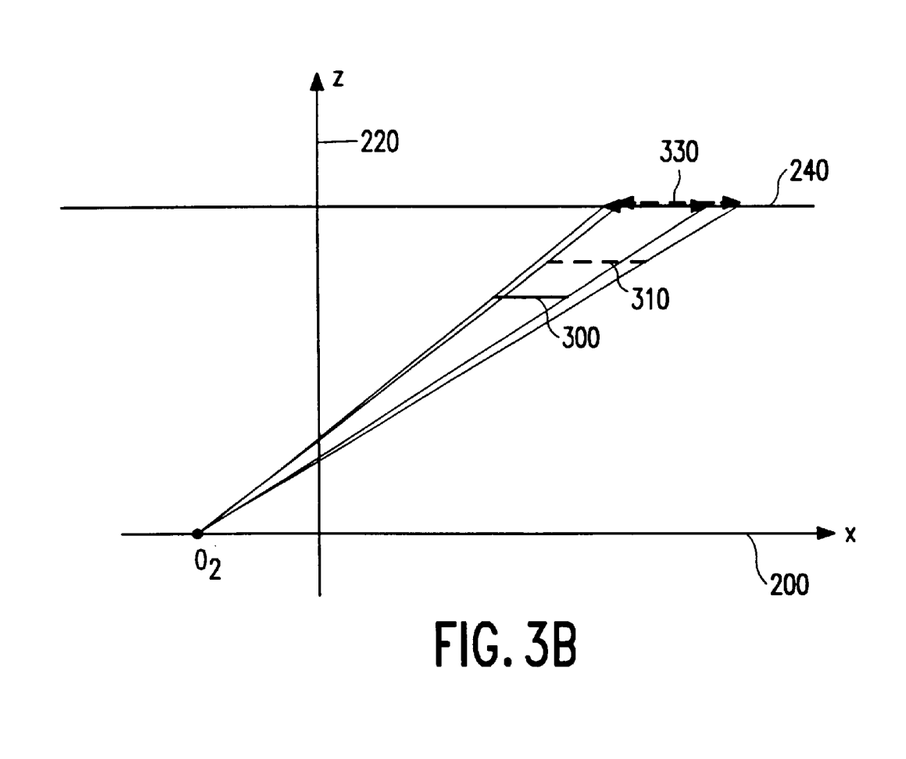

FIG. 3A shows a scene observed from observation point $O_1$, corresponding to the input image, wherein a nearby object 300 is partially overlapping a further removed object 310. For clarity, the y-coordinates are not shown in the figure. Due to the overlapping, the input image comprises all pixels of object 300 and only some of pixels 310, as illustrated by the observed image 320. FIG. 3B shows the same scene observed from observation point $O_2$, which corresponds to the output image. As is clear from the FIG. 3B the overlap has increased. If the output image 330 of FIG. 3B is derived from the input image 320 of FIG. 3A, this increased overlap will be reflected by an input pixel corresponding to the background object 310 being shifted to the same output pixel position as an input pixel corresponding to the foreground object 300. In the areas of overlap there are several candidates for the pixel values in the output image. Clearly, the input pixel values of those input pixels belonging to the object with the lowest depth z must occupy the overlap area in the output image, if the objects are opaque, reflecting a nearby object hiding part of a background object. Alternatively, the pixel values in the area of overlap in the output image can be obtained through mixing the pixel values belonging to the different objects. It should be noted that the overlap occurs due to objects having different depths resulting in a different shift. The position of the objects with respect to the focus plane is not relevant.

Figure 4A:
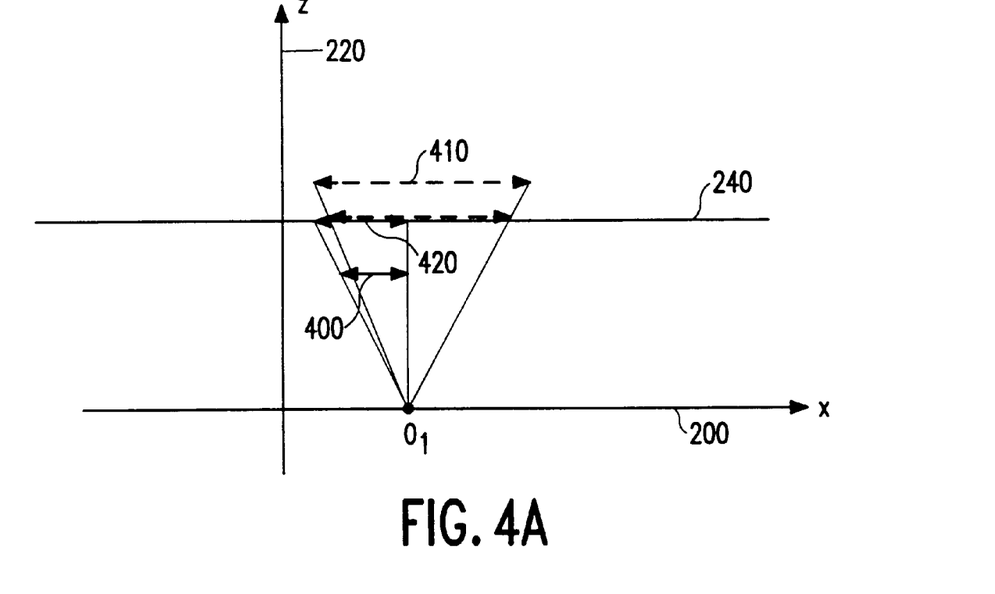
FIGS. 4A–4B illustrate the appearance of a hole when objects are observed from a different position.
Figure 4B:
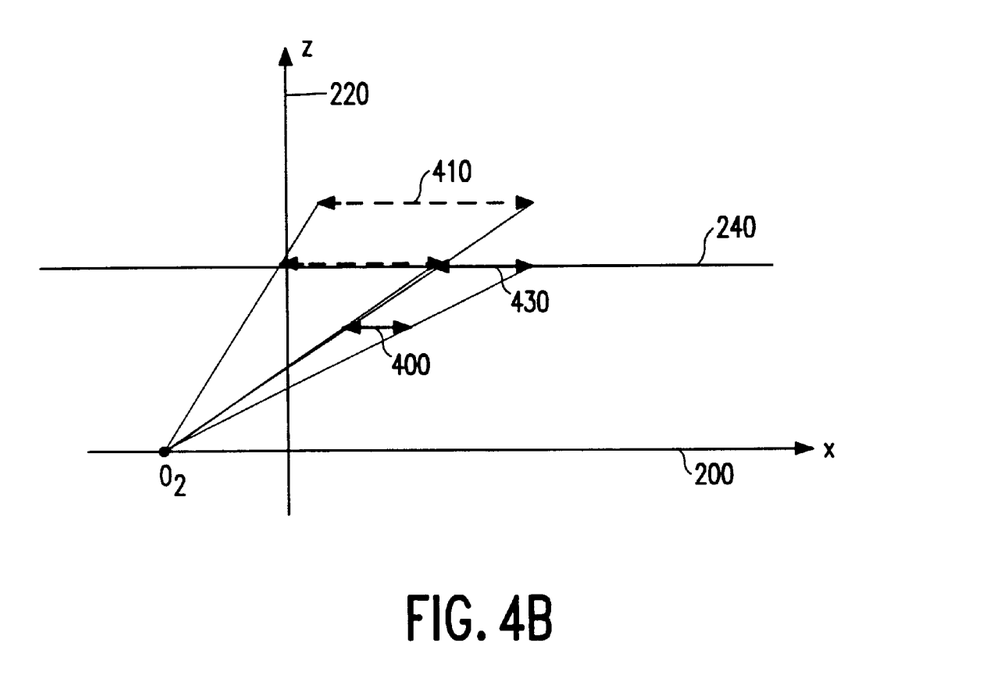

In contrast to different pixels of the input image being shifted to the same output pixel position, FIG. 4 shows an example wherein a 'hole' occurs in the output image 430 due to the fact that no input pixel is present to fill a position in the output image 430. FIG. 4A shows that in the input image 420 a background object 410 is at least partly obscured by a foreground 400. In FIG. 4B no overlap (or a smaller overlap) occurs between the objects 400 and 410 as represented in the output image 430, observed from the observation point $O_2$. Such hole artifacts can be removed by substituting a pixel value obtained through interpolation of the horizontally neighbouring pixel values that are available left and right of the hole. As a simple alternative, the value is substituted of the available neighbouring pixel with the greatest z-value. Such a substitution matches real life experience when the observer watches a background object emerging from behind a foreground object.

Similar considerations as applied to the removal of hole artifacts and to the selection of the pixel value among multiple candidates apply to edge effects at the boundary of the pixel array. A solution to the edge effects could be the processing of a larger array than is eventually displayed.

Figure 5:
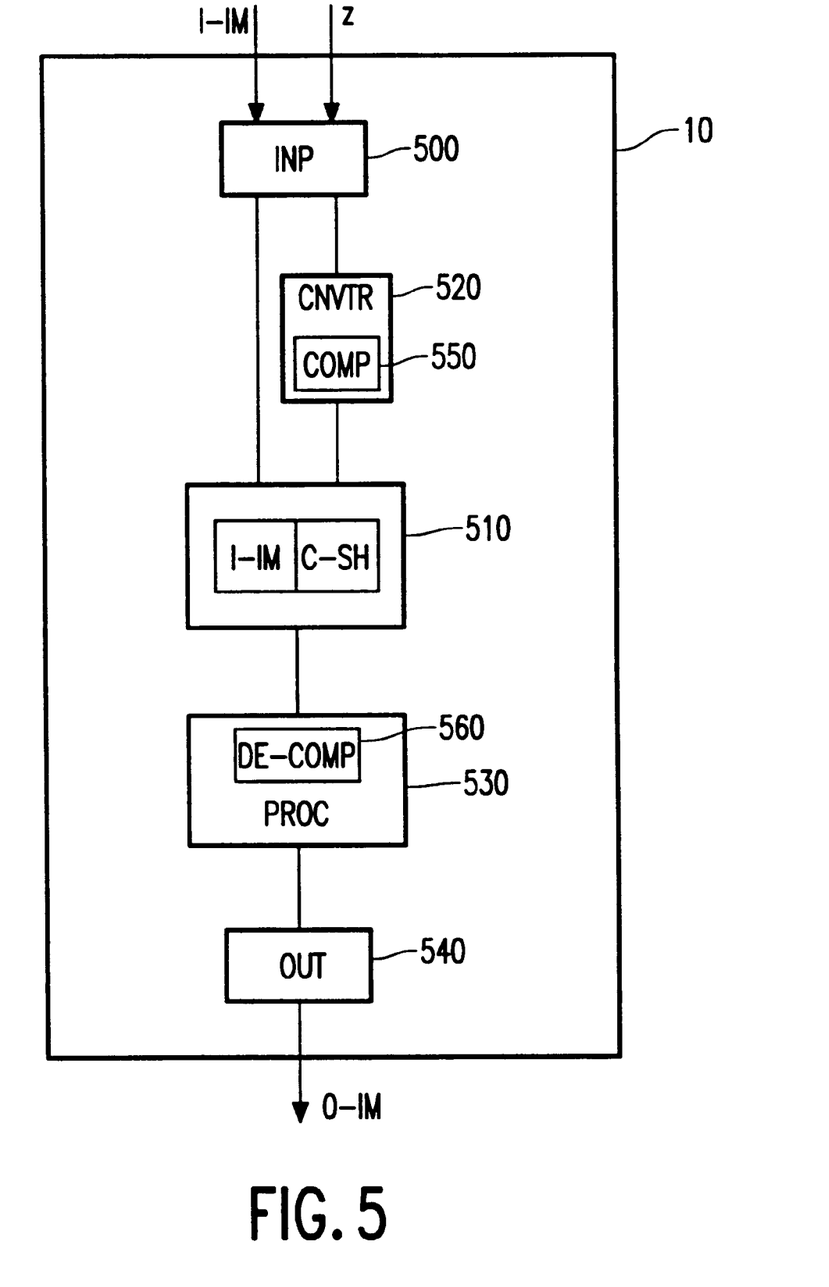
FIG. 5 shows a block diagram of an image processing system according to the invention.

FIG. 5 shows a block diagram of the image processing system 10 according to the invention. The image processing system 10 comprises the functionality of the system indicated in FIG. 1 with the identical numeral 10. The image processing system 10 comprises input means 500 for receiving input pixels of an input image. The input means 500 may be implemented in a conventional manner for memory or processor inputs. For each input pixel the input means 500 receives a pixel value and stores the received value in a memory 510. Additionally, the input means 500 receives for each input pixel a respective input pixel depth. A depth converter 520 converts the received depth into a pixel shift, according to above formula (1). It will be appreciated that, in general, a pixel shift along a row according to formula (1), will not exactly correspond to a pixel position. The reason for this discrepancy is simply the fact that there are only a finite number of discrete pixel positions in a row of the pixel array. In order to obtain discrete pixel positions, the pixel shift obtained as a result of the shift represented by formula (1) may, for instance, be rounded off upwards or downwards or truncated. The converter 520 may be implemented using a conventional hardware or software implementation. Typically, the depth converter 520 converts a depth value with a large value range of, e.g., 16 bits, into a shift value with a much smaller range of, e.g., 4 bits. Advantageously, a table is used for the conversion. As an example, the table may comprise sixteen entries, each entry corresponding to a different shift value. For instance, entry 1 corresponds to a shift of 7 pixel positions, entry 2 to a shift of 6 pixel positions, . . . , entry 7 to a shift of 1 pixel position, entry 8 to no shift, entry 9 to a shift of 1 pixel position in opposite direction, entry 10 to a shift of 2 pixel positions in opposite direction, . . . , entry 16 to a shift of 8 pixel positions in opposite direction. In this example, one less positive shift is used than negative shift due to the asymmetrical nature of integer numbers. For each entry the upper depth value corresponding to the shift value is stored. By locating for an input depth value the entry which just includes the input depth also the corresponding shift is located. It will be appreciated that the depth converter 520 converts depth related information into shift related information. The information itself may take various forms. For instance, if so desired an application could supply the depth related information in the form of a z-value or, alternatively, as a 1/z value. Particularly the use of the table allows a flexible implementation of the depth converter. If various formats of the information need to be supported by a depth converter, it is advantageous to store the conversion table in non-volatile memory, such as EEPROM. Alternatively, the table may be stored in volatile memory, such as RAM, and loaded into the memory, for instance, by a software driver. The converter 520 stores the generated pixel shift in a memory, which is, preferably, the same as the memory 510.

The image processing system 10 further comprises a processor 530. The processor 530 creates the output pixels of the output image from the input pixels of the input image. The value of an output pixel is formed from the value of one or more input pixels which parallactically relate to the position of the output pixel. The processor 530 determines which input pixel(s) relate to a given output pixel by using the stored pixel shift. As an example, to form the output pixel at a given row of the output image and pixel position i (column number), the processor 530 checks input pixels at the same row. For these input pixels, the pixel position is combined with the pixel shift. If this combination results in the pixel position i (or near pixel position i, as will be explained in more detail below) then such an input pixel is parallactically related to the output pixel. As an example, an input pixel at position i−3 having a corresponding input pixel shift of 3, an input pixel at position i having a corresponding input pixel shift of 0, and an input pixel at position i+4 having a corresponding input pixel shift of −4 are all shifted to a position corresponding to pixel position i of the output image row, and, therefore, are parallactically related to this pixel position.

The image processing system 10 further comprises output means 540 for outputting the values of the created output pixels. The output means 540 may be implemented in a conventional manner for memory or processor outputs. It will be appreciated that the input means 500 (including the depth converter 520), the memory 510, the processor 530 and the output means 540 may all be integrated into one IC.

In a further embodiment according to the invention, the depth converter 520 comprises a compressor 550 for compressing the input pixel shift relating to one or more input pixels to an input pixel shift representation. The representation is then stored in the memory 510 instead of storing the full shift value for each input pixel. Preferably, a run-length encoding technique is used for compressing the input pixel shifts. The depth of many objects only varies little. As a consequence many neighbouring pixels relating to the same object have the same shift value. Using a run-length encoding, successive pixels with the same pixel shift value are represented by one run-length item, which specifies the shift value and the number of successive pixels (run-length) having that value. Advantageously, a delta-run-length encoding is used to compress the pixel shift values even further. Usually, the depth of an object varies gradually. As a consequence, when the pixel shift value changes (resulting in a new run-length item), the change in pixel shift value tends to be similar to a previous change. The difference (referred to as delta) in pixel shift values, therefore, tends to be even smaller in range. Using a delta-run-length encoding these delta values are kept in addition to an indication of where the shift value changes (usually indicated as a length starting from the previous change point). It has been found that in many situations it is sufficient to use five bits for encoding the length of a segment. Five bits allows the representation of segments of two to 33 successive pixel locations having the same shift value. Obviously segments of zero length do not need to be encoded. Segments of only one pixel are dealt with separately. For a normal segment, two additional bits are used to encode the delta value. This gives a total code of seven bits. For those situations wherein the delta value changes more than can be indicated using the 2 bits, an alternative code is used which gives the full delta value. In the example presented here, up to seven bits are reserved for this. In this second format, no spare bits are available for encoding the segment length. The second code is, therefore, used for indicating only a one bit segment. In the situation where a too large jump occurs in the delta value to be able to use the first code and the new segment is longer than one bit, firstly the second code is used for giving the appropriate delta value for the first pixel of the segment, followed by the first code for giving the length of the remainder of the segment. In order to discriminate between both codes a selection bit is used. A value '0' of the selection bit indicates that the following seven bits are encoded as described for the first code; a value '1' of the selection bit indicates that the following seven bits are encoded as described for the second code. The following table summarises the encoding:

|  | Selection bit | Contents (7 bits) |
| --- | --- | --- |
| First code | 0 | 5 bits length, 2 bits delta |
| Second code | 1 | up to 7 bits delta |

The processor 530 uses a complementary decompressor 560 for restoring the original pixel shifts from the stored pixel shift representation. Conventional techniques, such as counters, registers, subtractors and comparators may be used to implement the compressor 550 and the decompressor 560.

Figure 6:
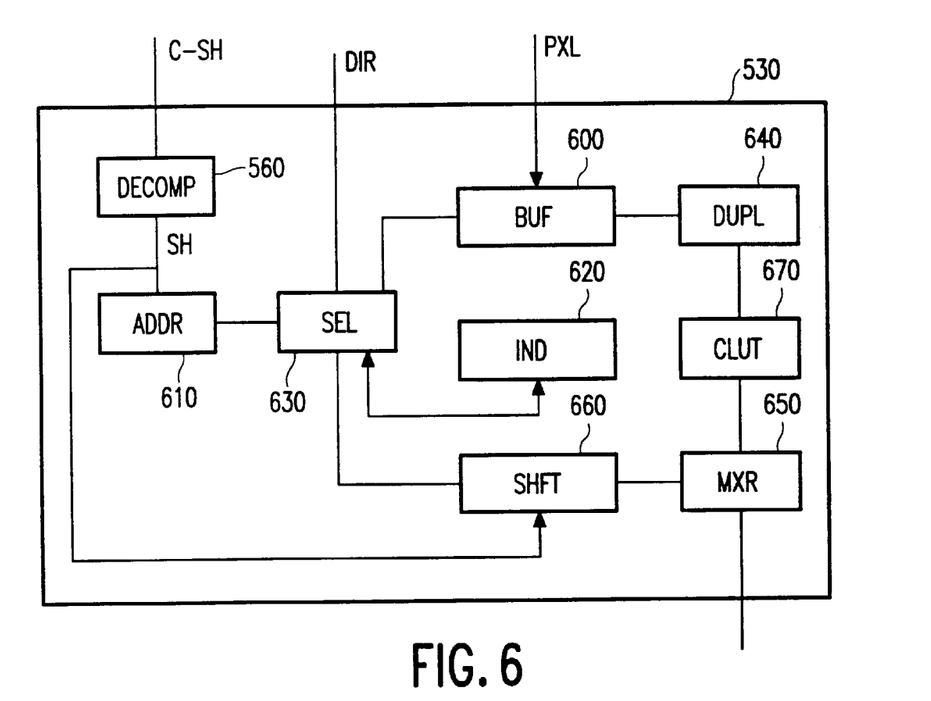
FIG. 6 illustrates an embodiment of the image processing system according to the invention.

FIG. 6 illustrates a further embodiment according to the invention, wherein the processor 530 comprises a sliding buffer 600 for storing pixel values. If the maximum number of different shift values is limited to N, including possible shifts to the left, to the right and no shift at all, then the buffer 600 comprises at least N locations for storing pixel values. The processor 530 stores an input pixel value in the buffer 600 depending on the corresponding pixel shift, implying that the input pixel may be stored at any of the buffer locations. The processor 530 comprises an address resolver 610 for determining at which address an input pixel should be stored in the buffer 600. This address may be resolved by adding the corresponding input pixel shift to a middle address of the buffer 600. In such a case an input pixel which does not need to be shifted is assigned the address of the middle location of the buffer 600. A maximum shift results in the input pixel being assigned either the lowest or the highest location address of the buffer 600. Each time an input pixel has been processed, and may have been copied into the buffer 600, also a pixel value is removed from the buffer 600. The pixel is removed from a known output location in the buffer 600. After processing an input pixel, the contents of the buffer 600 is shifted one location. As an example, assume that the input pixels are sequentially processed per row where each successive input pixel corresponds to a location with a column number which is one higher. Assume further that this corresponds to processing pixels from left to right. A positive shift value indicates a shift to the right; a negative shift value indicates a shift to the right. In the sequential processing of the example, each location is shifted down one position. As a consequence, the middle address of the buffer 600 corresponds to the next input pixel as before, assuming that this input pixel does not need to be shifted. During the shifting of the buffer or prior to the shifting, the value stored in the output location, being the location with the lowest address, is output from the buffer. It will be appreciated that the sliding buffer 600 may also be implemented using other techniques. For example, physically copying each value stored in the buffer during the shifting of the buffer may be avoided by performing only a logical shifting operation, e.g. by adjusting pointers in a manner well known for managing cyclic buffers.

Figure 7A:
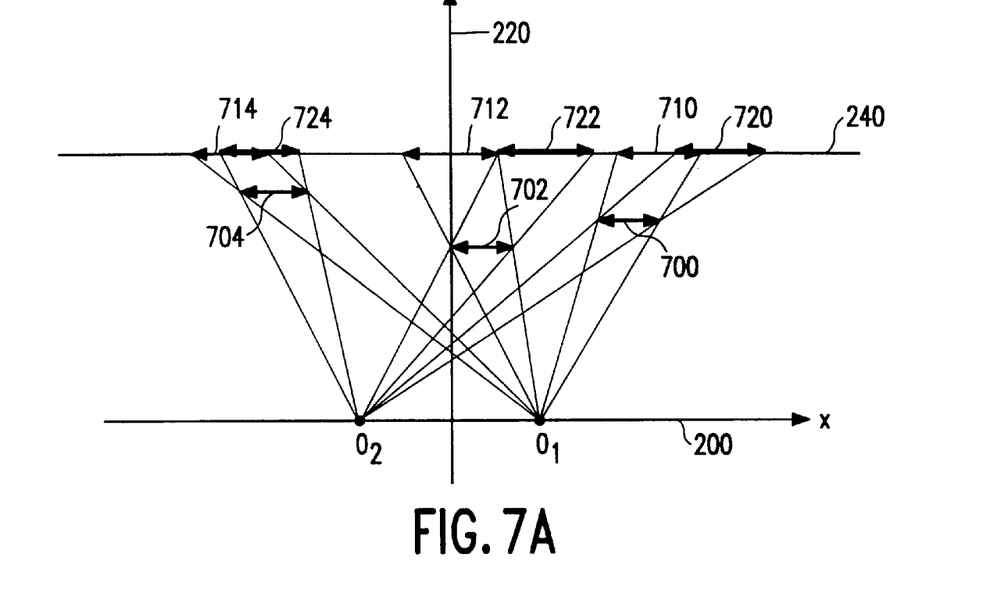
FIG. 7A–7B illustrate relative shifts of objects.
Figure 7B:
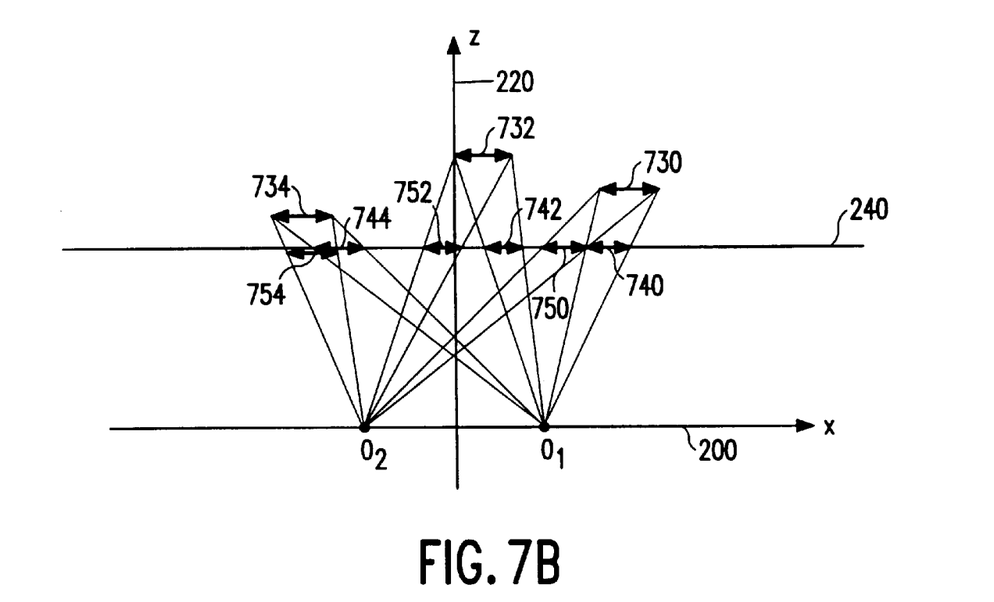

In a further embodiment according to the invention, the processor 530 comprises an indicator 620 for indicating whether the locations of the sliding buffer 600 are occupied by a pixel value or not. Whenever a pixel is stored at a location in the sliding buffer 600, the processor 530 sets the indicator 620 to indicate that the location is occupied. Whenever the sliding buffer 600 is shifted, the processor sets the indicator 620 to indicate that a location is not occupied. In the example given above, shifting the sliding buffer 600 results in the highest location being free. The indicator 620 is further updated each time the sliding buffer is shifted to ensure that the indicator stays synchronised with the actual buffer locations. The indicator 620 may be implemented using a register, where each bit location of the register corresponds to a buffer location. Each bit indicates whether the corresponding buffer location is occupied or not. Alternatively, the indicator 620 may be combined with the sliding buffer 600. For example, each location of the sliding buffer 600 may be able to store at least one additional bit indicating whether or not a pixel value is stored in the remaining part of the buffer location. Also a reserved value, not used as a valid pixel value, may be used to indicate that a buffer location is free. In the situation that a pixel corresponding to a foreground object and a pixel corresponding to a background object are shifted to the same position in the output image, the processor 530 selects the foreground pixel to be stored in the sliding buffer 600. The processor 530 performs the selection by only copying an input pixel into a location of the sliding buffer 600 if the indicator 620 indicates that the location is not occupied. FIG. 7A shows three objects 700, 702 and 704 all located in front of the focus plane 240 and at different positions compared to the input observation point $O_1$ and the output observation point $O_2$. Also the respective projections 710, 712 and 714 as present in the input image and the respective projections 720, 722 and 724 as present in the output image are shown. FIG. 7B similarly shows three objects 730, 732, 734 all located behind the focus plane 240 and at different positions compared to the observation points. Also the respective projections 740, 742 and 744 as present in the input image and the respective projection 750, 752 and 754 as present in the output image are shown. The notion that the foremost object pixel can be selected simply by selecting a pixel based on whether a location is already occupied or not, is based on the insight that, although a pixel may in absolute terms be shifted in either direction, for a given set of an input image and output image the relative shift of a background pixel compared to foreground pixel is always in the same direction. As shown in FIG. 7A for objects in front of the focus plane 240, it is clear that the output image, represented by the image segments 720, 722 and 724 can be derived from the respective input image segments 710, 712 and 714 by shifting the segment pixels to the right, irrespective of the segments being to the left or the right of the observation points. Similarly, as shown in FIG. 7B for objects behind the focus plane 240, it is clear that the output image, represented by the image segments 750, 752 and 754 can be derived from the respective input image segments 740, 742 and 744 by shifting the segment pixels to the left. As already described earlier, the amount of shift is determined by the depth associated with the pixel. As an example, assume that five consecutive pixels p1 . . . p5 are sequentially processed, where p1 is the left most pixel and p5 is the right most pixel of the sequence. Assuming further that all five pixels are shifted to the same output pixel position p3, as reflected by the five corresponding pixel shifts being: p1: +2; p2: +1; p3: 0; p4: −1; p5: −2. Recalling the situation as shown in FIG. 7, it is clear that this implies that p1 was the foremost pixel and p5 was the rearmost pixel. It is desired to display the foremost pixel. By processing the input pixels from left to right, this can be achieved by copying input pixel p1 to output pixel p3 and not copying input pixels p2, p3, p4, and p5 (effectively discarding those four pixels). This can be detected by checking whether the output location of p3 is already occupied by a previously copied input pixel. If so, the occupying pixel can only be there because it was more to the front. In FIG. 7 the observation point of the output image is to the left of the observation point of the input image. It will be appreciated that a same result is achieved if the observation point of the output image is to the right of the observation point of the input image (resulting in a reverse direction of the pixel shift, implying that p5 is actually the foremost input pixel) and if the pixels are processed from right to left.

If the observation point of the output image is to the right of the observation point of the input image, the desired result can be achieved even more simply by processing the pixels from left to right and always copying the input pixel regardless of the location already being occupied or not. In this situation, p5 is the foremost input pixel. By copying without even testing whether the location is already occupied, the foremost pixel is automatically copied on top of background pixels. The same principle applies if the observation point of the output image is to the left of the observation point of the input image and the pixels are processed from right to left.

Above insight for achieving the required selection of the foreground pixel by means of simple copying strategies, is summarised in the following table.

| Offset input observation point -> output observation point | Direction of pixel processing | Copying scheme |
|---|---|---|
| Right -> Left | Left -> Right | Copy if location still free |
|  | Right -> Left | Copy always |
| Left -> Right | Left -> Right | Copy always |
|  | Right -> Left | Copy if location still free |

In a further embodiment according to the invention, the processor 530 processes the input pixels in a given direction. Based on above insight, the processor 530 comprises a selector 630 for selectively copying an input pixel value into a location of the buffer 600 in dependence of the a relative position of the observation point of the output image compared to observation point of the input image. As is also indicated in the table above, if the direction from the input observation point to the output observation point is the same as the processing direction, then the desired result is achieved by always copying the input pixel. If, however, both directions are opposite, then the desired result is achieved by only copying if the location is still free. The selector 630 has an input for receiving information with regard to the direction from the input observation point to the output observation point. By comparing this information to the given processing direction of the processor, the selector 630 performs the appropriate copying scheme.

It will be appreciated that with the system according to the invention it is possible to derive one or more output images from one input image. For conventional stereoscopy, at any moment in time only two output images are presented to the user. In a situation where more than one output image is generated, it is preferred that the input image already constitutes one of the output images. This simplifies processing, since one of the output images does not need to be generated. It is also advantageous that the observation point of the input image is not in between the observation points of the output images. This ensures that the copying scheme is the same for both images. If additionally it is guaranteed that for input images the observation point is always offset in the same direction compared to the observation points of the output images, then only one of the four options shown in above table needs to be supported.

Preferably, the processor 530 is directly connected to the display system. Referring back to FIG. 1, this implies that no memory 190 is required. The memory can be removed due the efficient use of the sliding buffer 600 and the pre-processing performed by the depth converter 520, allowing 'on the fly' generation of the output images without the need for additional image storage.

As described earlier 'holes' may appear as a result of the depth dependent shift. For some pixel positions in the output image no input pixel may be available (representing that a further removed object moved further out of the 'shadow' of a nearby object). In such a case, it is preferred to fill the hole by copying one of the neighbouring pixels, which is furthest removed. In a further embodiment according to the invention, the processor 530 of FIG. 6 comprises a duplicator 640 for copying a neighbouring pixel. A hole has occurred if the output location of the buffer 600 is empty, as indicated by the indicator 620, at the moment a pixel value should be output from the output location. Normally the duplicator 640 should then either reproduce the pixel value which was output previously or the pixel value which is going to be output next. Such a choice should be based on the corresponding depth information of the input pixels involved. The duplicator 640, however, achieves the desired result by simply reproducing a previously output pixel value if the indicator indicates that the output location is empty. The notion that such a simple approach achieves the desired result is based on the same insight as used for dealing with the overlapping, being that, although a pixel may in absolute terms be shifted in either direction, for a given set of an input image and output image the relative shift of a background pixel compared to foreground pixel is always in the same direction. As shown in FIG. 7A for objects in front of the focus plane 240, it is clear that the output image, represented by the image segments 720, 722 and 724 can be derived from the respective input image segments 710, 712 and 714 by shifting the segment pixels to the right, irrespective of the segments being to the left or the right of the observation points. Similarly, as shown in FIG. 7B for objects behind the focus plane 240, it is clear that the output image, represented by the image segments 750, 752 and 754 can be derived from the respective input image segments 740, 742 and 744 by shifting the segment pixels to the left. As already described earlier, the amount of shift is determined by the depth associated with the pixel. By combining these observations, it is clear that a background object compared to a foreground object is shifted to the left (it should be noted that actually both objects are shifted to right if they are both in front of the focus plane 740; in which case the foreground object moves more to the right, still giving a relative movement to the left of the background object). As a consequence, a hole can only appear at the left edge of a foreground object. This implies that the hole can be filled with the desired background pixel by processing the image from left to right and reproducing the previous pixel value if a hole is detected. It will be appreciated that the same scheme applies if the output observation point is to the right of the input observation point and the pixels are processed from right to left. Consequently, it is preferred that the direction from the input observation point to the output observation point is opposite to the direction in which the processor processes the input pixels of a row of the input image.

It should be noted that without precautions artifacts may occur around edges of an object. For instance if in the input image the left edge of a background object is covered by a foreground object and due to the shift the left edge of the background image becomes visible, then no pixel of the background image is available to be copied. In a simple system, the available previous pixel (in this case not the appropriate background pixel) may be copied anyhow, resulting in a small artifact. In a more advanced system, the background pixel may be generated separately, e.g. by deriving it from the 3D model, or by mixing neighbouring pixels from the same row or even adjacent rows.

Figure 8:
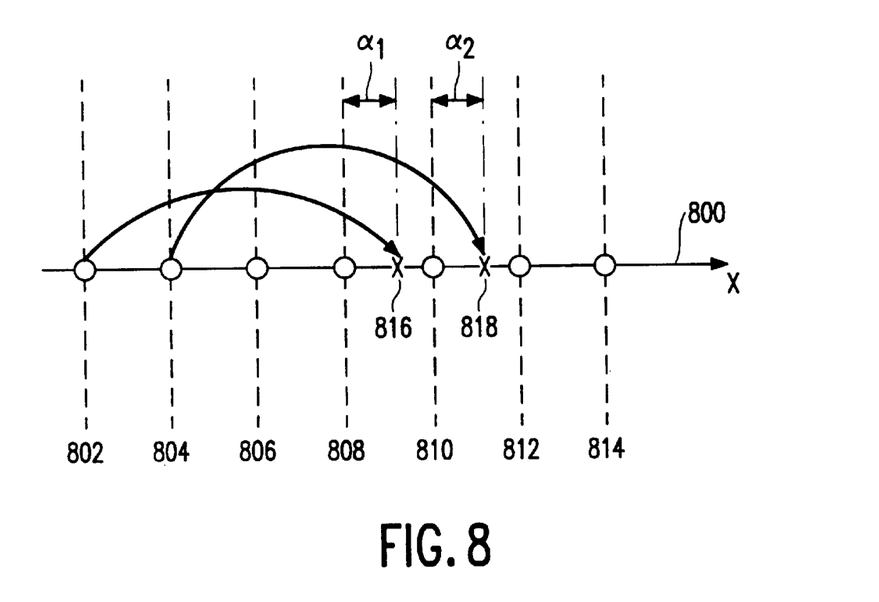
FIG. 8 illustrates shifts to sub-pixel locations.

As described earlier the buffer location for storing a pixel in the buffer 600 is determined from the input location of the input pixel combined with the shift of the input pixel. The shift is calculated using formula (1). Since a pixel can only be stored and shown at discrete pixel positions, the calculated shift is, typically, truncated or rounded. Experiments have shown that this may result in an observer experiencing planes with different shifts. To overcome such artifacts, a further embodiment according to the invention also uses sub-pixel shift information. Using four sub-pixel shift positions, effectively extending the shift information with two bits, has proven to give good results. As before, the sub-pixel shift information is not required for determining the address for storing the value of a pixel. The sub-pixel shift information is used for improving the display quality. To this end, the processor 530 further comprises a mixer 650 for blending pixel values of neighbouring pixel. The weighting factors of the blending depend on the sub-pixel shift information of the pixels to be blended. An example of this is illustrated in FIG. 8, where a part of a row 800 of pixel positions 802, 804, 806, 808, 810, 812 and 814 is shown. Due to the parallactic shifts calculated according to formula (1), the value of the input pixel at position 802 in the input image is mapped to a location 816, lying between successive pixel positions 808 and 810. Similarly, the value of the input pixel at position 804 is mapped to a location 818, lying between successive pixel positions 810 and 812. Let $\alpha_1$ denote the distance from position 808 to location 816. As such $\alpha_1$ corresponds to the sub-pixel shift of the input pixel of position 802. Similarly, $\alpha_2$ denotes the distance from position 810 to location 818 and corresponds to the sub-pixel shift of the input pixel of position 804. Further, let $c_1$ denote the input pixel value of the input pixel at position 802 in the input image (i.e. prior to the shift) and let $c_2$ denote the input pixel value of the input pixel at position 804. Output pixel 810 in the output image, that is, after the shifts have been performed, is assigned an output pixel value which is determined by the values of the input pixels at positions 802 and 804 according to a weighted sum. The value $c_3$ assigned to output pixel 810 in the output image is then calculated according to:

$$c_3 = \{(1-\alpha_1)c_1 + \alpha_2 c_2\}/\{1-\alpha_1+\alpha_2\}$$

The terms $(1-\alpha_1)$ and $\alpha_2$ are weight factors based on the sub-pixel shift. The term $1-\alpha_1+\alpha_2$ ensures that the entire weight of the pixel is maintained. Since in many situations the sub-pixel shift of successive pixels changes only little, and consequently $1-\alpha_1+\alpha_2$ tends to be near to 1, this term may also be deleted for simple systems. It is clear that for the blending the pixel values as well as the sub-pixel shift values of the involved pixels are required. To this end, the processor 530 further comprises a sub-pixel shift buffer 660 with the same number of locations as the buffer 600. For each pixel value stored in the buffer 600, the corresponding sub-pixel shift is stored in the sub-pixel shift buffer 660. Preferably, the sub-pixel shift buffer 660 is managed in the same way as the buffer 600. This is advantageously achieved by combining both buffers.

To reduce storage requirements for storing pixel values, the pixel values may be encoded using a Colour Look-Up Table (CLUT) scheme. If so, the decoding is, preferably, performed before mixing the pixels. To this end, the processor 530 comprises a CLUT 670 for performing the decoding.

It should be noted that, due to the truncating (or rounding) of the sub-pixel shift, small artifacts may occur. As an example, assume that pixels of a foreground object at successive column positions of the same row change significantly in depth resulting in an increase in shift for successive pixel positions, e.g. for input pixel position i and successive pixels a respective shift of x, x+¼, x+½, x+¾, x+1 and x+1¼ is calculated. By truncating the sub-pixel shift, this implies that the value of pixel i of the input image is copied to pixel position i+x of the output image at the same row. The following table shows this for the six successive pixels.

| Input position | Total shift | Truncated shift | Output position |
|---|---|---|---|
| i | x | x | i + x |
| i + 1 | x + ¼ | x | i + x + 1 |
| i + 2 | x + ½ | x | i + x + 2 |

-continued

| Input position | Total shift | Truncated shift | Output position |
|---|---|---|---|
| i + 3 | x + ¾ | x | i + x + 3 |
| i + 4 | x + 1 | x + 1 | i + x + 5 |
| i + 5 | x + 1¼ | x + 1 | i + x + 6 |

This results in a 'hole' for pixel i+4+x in the output image. In principle it is possible that a pixel of a background object is shifted to this position. To avoid that such a background pixel would 'break through' a foreground object, additional measures may be taken. For instance, if the truncated shift of successive pixels increases (indicating skipping one or more pixels), the previous foreground pixel may be copied into the skipped pixel position(s).

The system according to the invention can also be used for 'virtual reality' where a person can navigate through a scene. For such systems, preferably, the input image is the first image of a scene. A number of successive images are then derived from this input image instead of from the 3D model. This may be repeated for a predetermined number of images or until the user moves more than a predetermined distance (e.g. outside the shift region around the input image).

In the system according to the invention, the 2D input image and depth information are, typically, generated by a rendering process which is applied to a 3D-model created based on a 3D co-ordinate system. It will be appreciated that high-quality stereoscopic images for real-time applications can be generated by operating two of these rendering processes in parallel. This, however, is an expensive solution since the rendering process usually requires dedicated, expensive hardware in order to handle moving images, shadows and shades, different viewpoints, etc. Similar considerations apply to the generation of a sequence of 2D-images to give the impression of motion in a 3D-scenery. For example, when the user is navigating through a virtual reality scenery shown on a display, each next image in the sequence should show the scenery from a slightly different view point and, therefore, involves a completely new rendering process. In general, this requires massive computing power in real time applications. In the system according to the invention only one rendering process or a scaled down version of a rendering process can be used to generate one basic image with depth information for each scene, where the graphical processing according to the invention is used to derive output images from the input image with depth information.

What is claimed is:

1. An image processing system for generating at least one output image related to an input image through a parallactic transformation; the image processing system comprising:
   input means;
   output means;
   a memory; and
   a processor,
   the input means comprising means for receiving a respective input pixel value and input pixel depth of input pixels of the input image and for storing received input pixel values in the memory,
   the processor being operative to create output pixels of the output image by deriving for the output pixel a respective output pixel value from the input pixel value of at least one input pixel, which is parallactically related to the output pixel, the parallactic relationship being a function of the respective input pixel depth,
   the output means comprising means for outputting the output pixel values,
   the input means further comprising a depth converter for converting the input pixel depth into an input pixel shift and for storing a representation of the input pixel shift in the memory, and
   the processor being conceived to determine the parallactic relationship between an output pixel and an input pixel based on the stored input pixel shift representation corresponding to the input pixel.

2. The system as claimed in claim 1, wherein:
   the pixel shift is limited to a predetermined maximum of N pixel positions; and
   the processor comprises a sliding buffer with at least N locations for storing pixel values and the processor is operative to process successive input pixels, said processing comprising:
      copying the respective input pixel value from the memory into the sliding buffer at a location with an offset depending on the corresponding input pixel shift,
      outputting an output pixel value by reading a pixel value from an output location in the sliding buffer, and
      shifting the sliding buffer.

3. The system as claimed in claim 2, wherein the processor is operative to, if a foreground and a background input pixel are parallactically related to a same output pixel, select the foreground input pixel for further processing, characterised in that the processor comprises an indicator for indicating whether the sliding buffer locations are occupied; in that the processor is operative to perform the selection by only copying an input pixel value into a location of the sliding buffer if the indicator indicates that the location is not occupied.

4. The system as claimed in claim 2, wherein:
   the processor is operative to, if a foreground and a background input pixel are parallactically related to a same output pixel, select the foreground input pixel for further processing;
   the processor comprises an indicator for indicating whether the sliding buffer locations are occupied;
   the processor is conceived to process input pixels of a row of the input image in a given processing direction;
   the processor comprises a selector for selectively copying an input pixel value into a location of the sliding buffer, in dependence of a relative position of an output observation point matching the output image compared to an input observation point matching the input image;
   and the selector is operative to:
      if the direction from the input observation point to the output observation point is the same as the processing direction, copy the input pixel value irrespective of the location being occupied, and
      if the direction from the input observation point to the output observation point is opposite to the processing direction, copy the input pixel value if the indicator indicates that the location is not occupied.

5. The system as claimed in claim 2, wherein:
   the processor comprises a duplicator for, if none of the input pixels is parallactically related to a given output pixel, creating a respective output pixel value of the output pixel by reproducing an input pixel value;
   the processor comprises an indicator for indicating whether the sliding buffer locations are occupied; and
   the duplicator is operative to reproduce a pixel value which was output previously from the sliding buffer if the indicator indicates that the predetermined output location of the sliding buffer is not occupied.

6. The system as claimed in claim 1, wherein:

the input pixel shift comprises a sub-pixel shift indicative of a shift of the corresponding input pixel to a position in between pixel positions of the output image; and the processor comprises a mixer for blending pixel values of neighbouring pixels, where weighting factors of the blending depend on the sub-pixel shift of the neighbouring pixels.

7. The system as claimed in claim 1, wherein the depth converter comprises a table for converting the input pixel depth into the input pixel shift.

8. The system as claimed in claim 1, wherein the depth converter comprises compression means for compressing the input pixel shift of at least one input pixel into the input pixel shift representation, and in that the processor comprises decompression means for decompressing the input pixel shift representation into the input pixel shift of the corresponding input pixel(s).

9. The system as claimed in claim 1, wherein the processor is operative to generate at least two output images, which are related to the same input image through a parallactic transformation, characterised in that the input image constitutes one of the output images.

10. The system as claimed in claim 1, wherein the processor is operative to generate at least two output images which are related to the same input image through a parallactic transformation, characterised in that an input observation point matching the input image is not horizontally in between output observation points matching each of the output images.

11. The system as claimed in claim 10, wherein the direction from the input observation point to the output observation point is opposite to the direction in which the processor processes the input pixels of a row of the input image.

12. The system as claimed in claim 1, wherein the system comprises a display system for displaying the output image on a display, characterised in that the processor is directly connected to the display system for supplying the output pixels.

13. A processor for parallactically transforming an input image into at least one output image, said processor comprising:

an input for receiving a respective input pixel value of input pixels of the input image; and an output for outputting a respective output pixel value for output pixels of the output image, said processor being operative to create the output pixel by deriving a respective output pixel value from the input pixel value of at least one input pixel, which is parallactically related to the output pixel;

an input for receiving a representation of a respective input pixel shift of the input pixel, the input pixel shift being limited to a predetermined maximum of N pixel positions; and a sliding buffer with at least N locations for storing pixel values; and the processor being operative to process successive input pixels, said processing comprising:

copying the respective input pixel value from the memory into the sliding buffer at a location with an offset depending on the corresponding input pixel shift, outputting an output pixel value by reading a pixel value from an output location in the sliding buffer, and shifting the sliding buffer.

14. The processor as claimed in claim 13, wherein the processor is operative to, if a foreground and a background input pixel are parallactically related to a same output pixel, select the foreground input pixel for further processing, wherein the processor comprises an indicator for indicating whether the sliding buffer locations are occupied; in that the processor is operative to perform the selection by only copying an input pixel value into a location of the sliding buffer if the indicator indicates that the location is not occupied.

15. The processor as claimed in claim 13, wherein:

the processor is operative to, if a foreground and a background input pixel are parallactically related to a same output pixel, select the foreground input pixel for further processing;

the processor further comprises an indicator for indicating whether the sliding buffer locations are occupied;

the processor is conceived to process input pixels of a row of the input image in a given processing direction;

the processor further comprises a selector for selectively copying an input pixel value into a location of the sliding buffer, in dependence of a relative position of an output observation point matching the output image compared to an input observation point matching the input image the selector is operative to:

if the direction from the input observation point to the output observation point is the same as the processing direction, copy the input pixel value iirespective of the location being occupied, and if the direction from the input observation point to the output observation point is opposite to the processing direction, copy the input pixel value if the indicator indicates that the location is not occupied.

16. The processor as claimed in claim 13, wherein the processor comprises a duplicator for, if none of the input pixels is parallactically related to a given output pixel, creating a respective output pixel value of the output pixel by reproducing an input pixel value, characterised in that the processor comprises an indicator for indicating whether the sliding buffer locations are occupied; and in that the duplicator is operative to reproduce a pixel value which was output previously from the sliding buffer if the indicator indicates that the predetermined output location of the sliding buffer is not occupied.

17. The processor as claimed in claim 13, wherein the input pixel shift comprises a sub-pixel shift indicative of a shift of the corresponding input pixel to a position in between pixel positions of the output image; and the processor comprises a mixer for blending pixel values of neighbouring pixels, where weighting factors of the blending depend on the sub-pixel shift of the neighbouring pixels.

* * * * *